United States Patent
Walther et al.

(10) Patent No.: US 11,548,067 B2
(45) Date of Patent: Jan. 10, 2023

(54) METHOD FOR PRODUCING AN OPEN-PORED METAL BODY HAVING AN OXIDE LAYER AND METAL BODY PRODUCED BY SAID METHOD

(71) Applicants: Alantum Europe GmbH, Munich (DE); FRAUNHOFER-GESELLSCHAFT ZUR FOERDERUNG DER ANGEWANDTEN FORSCHUNG E.V., Munich (DE)

(72) Inventors: Gunnar Walther, Dresden (DE); Tilo Buettner, Dresden (DE); Hans-Dietrich Boehm, Dresden (DE); Bernd Kieback, Dresden (DE); Thomas Weissgaerber, Dresden (DE); Arne Boden, Dresden (DE); Rene Poss, Hanau (DE); Tillmann Andreas, Unterhaching (DE); Robin Kolvenbach, Munich (DE); Lars Torkuhl, Munich (DE); Alexandra Gerstle, Munich (DE)

(73) Assignees: ALANTUM EUROPE GMBH, Munich (DE); FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 152 days.

(21) Appl. No.: 17/259,989

(22) PCT Filed: Jun. 18, 2019

(86) PCT No.: PCT/EP2019/065975
§ 371 (c)(1),
(2) Date: Jan. 13, 2021

(87) PCT Pub. No.: WO2020/015944
PCT Pub. Date: Jan. 23, 2020

(65) Prior Publication Data
US 2021/0308762 A1    Oct. 7, 2021

(30) Foreign Application Priority Data

Jul. 20, 2018  (DE) .................... 10 2018 212 110.9

(51) Int. Cl.
*B32B 5/18*      (2006.01)
*B22F 7/00*      (2006.01)
(Continued)

(52) U.S. Cl.
CPC .............. *B22F 7/006* (2013.01); *B22F 7/008* (2013.01); *B22F 7/08* (2013.01); *B22F 10/20* (2021.01);
(Continued)

(58) Field of Classification Search
None
See application file for complete search history.

(56) References Cited

U.S. PATENT DOCUMENTS

| 5,017,544 A | 5/1991 | Ikegami et al. |
| 8,012,598 B2 | 9/2011 | Naumann et al. |

(Continued)

FOREIGN PATENT DOCUMENTS

| CN | 107177813 A | * | 9/2017 |
| DE | 3883722 | | 2/1994 |

OTHER PUBLICATIONS

International Search Report.
German Examination Report.

*Primary Examiner* — Seth Dumbris
(74) *Attorney, Agent, or Firm* — Jacobson Holman PLLC

(57) ABSTRACT

An open-pored metal body, which is formed having a core layer (A) consisting of Ni, Co, Fe, Cu, Ag or an alloy formed having one of said chemical elements, wherein one of said chemical elements is present in the alloy at more than 25 at %, and a gradated layer (B) is formed on surfaces of the core layer (A), said gradated layer being formed by intermetallic phase or mixed crystals of Al, and a layer (C), which is formed having aluminum oxide, is formed on the gradated layer (B).

8 Claims, 1 Drawing Sheet

(51) Int. Cl.
  *B22F 10/20* (2021.01)
  *B22F 7/08* (2006.01)
  *C23C 8/12* (2006.01)
  *C23C 24/00* (2006.01)
  *C23C 28/00* (2006.01)
  *C25D 3/38* (2006.01)
  *B33Y 70/00* (2020.01)
  *B33Y 80/00* (2015.01)
  *B22F 7/04* (2006.01)

(52) U.S. Cl.
  CPC ............. *C23C 8/12* (2013.01); *C23C 24/00* (2013.01); *C23C 28/32* (2013.01); *C23C 28/345* (2013.01); *C25D 3/38* (2013.01); *B22F 2007/042* (2013.01); *B22F 2207/01* (2013.01); *B22F 2301/052* (2013.01); *B22F 2301/10* (2013.01); *B22F 2301/40* (2013.01); *B22F 2302/253* (2013.01); *B33Y 70/00* (2014.12); *B33Y 80/00* (2014.12); *Y10T 428/12479* (2015.01)

(56) References Cited

U.S. PATENT DOCUMENTS

| | | |
|---|---|---|
| 2005/0207929 A1* | 9/2005 | Yamada ............... B22F 3/1143 419/2 |
| 2007/0160518 A1 | 7/2007 | Galligan et al. |
| 2012/0302811 A1 | 11/2012 | Long et al. |
| 2013/0061987 A1 | 3/2013 | Prevond et al. |
| 2014/0106962 A1 | 4/2014 | Durante et al. |
| 2014/0221700 A1 | 8/2014 | Radivojevic et al. |

* cited by examiner

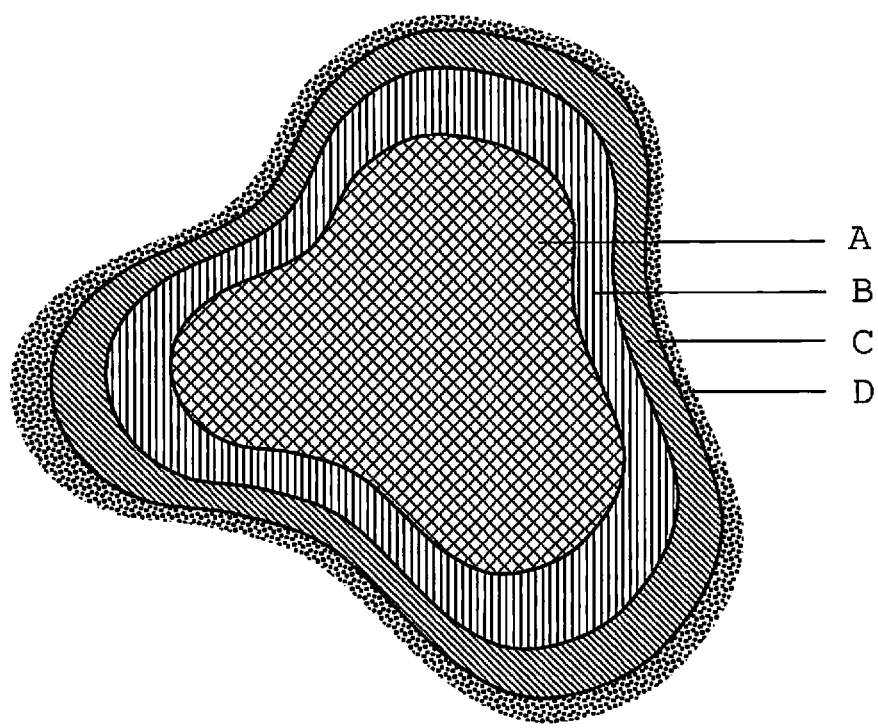

METHOD FOR PRODUCING AN OPEN-PORED METAL BODY HAVING AN OXIDE LAYER AND METAL BODY PRODUCED BY SAID METHOD

BACKGROUND OF THE INVENTION

The present invention relates to a process for producing an open-pored metal body, preferably an open-pored metal foam body having an oxide layer, in particular a structured support material based on an open-pored semifinished metal part, and also a metal body produced by the process. Open-pored bodies, in particular bodies which comprise a metal foam, are known per se. Pure metal bodies consisting of an element or an alloy, i.e., for example, metal foam struts without outer protective shell, have deficiencies such as a low mechanical strength of ductile metals, low thermal stability, lack of corrosion resistance and the undesirable migration of elements from the material of an open-pored body into a functional coating formed thereon. The undesirable migration of elements from the metallic material into an active, functional coating formed thereon can change the crystal structure, chemical composition and preferred oxidation states of elements of the coating and consequently adversely affect the function thereof as thermal conductor, electric conductor or catalyst for chemical reactions. Particularly in the case of catalytically active functional coatings, this can lead to poisoning of a catalytically active component, which can lead to impairment of the selectivity in favor of undesirable secondary reactions and also to accelerated aging and loss of the catalytic activity of a catalyst.

Thus, a metal foam for use in exhaust gas systems is known from US 2007/0160518 A1.

US 2014/0221700 A1 relates to a surface modified on the surface.

A catalyst having an aluminum oxide layer is disclosed in US 2012/0302811 A1.

DE 38 83 722 T2 describes a process for producing ferritic stainless steel.

U.S. Pat. No. 8,012,598 B2 relates to a metal foam body.

A process for producing a metal arrangement is disclosed in US 2013/0061987 A1.

A metal-supported catalyst structure is described in US 2014/0106962 A1.

SUMMARY OF THE INVENTION

It is an object of the present invention to provide open-pored materials composed of metals or metal alloys having chemically defined and structured pure or mixed-metallic aluminum oxide surface layers having a high proportion of aluminum oxide, and also a process comprising coating of metal or metal alloy foams with aluminum or particles composed of aluminum and at least one further metal M which form single-phase and/or multiphase alloys to give the open-pored structure, formation of substance-to-substance bonds and intermetallic phases within the coating and between coating and a layer forming a core (core layer), in particular a foam surface, by sintering of the coated semifinished part or melting of the coating and formation of a chemically defined, structured protective layer by means of a concluding oxidation step.

According to the invention, this object is achieved by a process having the features the claims and a metal body produced by the process. Advantageous embodiments and further developments of the invention can be realized by means of features indicated in dependent claims.

An open-pored metal body produced according to the invention comprises a core layer A consisting of Ni, Co, Fe, Cu, Ag or an alloy comprising one of these chemical elements, where one of these chemical elements is present in a proportion of more than 25 at %, preferably more than 50 at %, in the alloy. A gradated layer comprising intermetallic phases or mixed crystals of Al is present on surfaces of the core layer.

An oxide layer comprising aluminum oxide is in turn present on the gradated layer. The oxide layer is formed by pure $\alpha$-$Al_2O_3$ phase.

The gradated layer and/or the oxide layer C should cover the surface of the core layer to an extent of at least 90%, preferably completely.

The gradated layer B should advantageously have a layer thickness in the range from 1 μm to 50 μm and the oxide layer C should have a layer thickness in the range from 0.05 μm to 1 μm.

In the production process, the surface of a semifinished part forming the core layer should be coated with pure aluminum powder or a powder of an aluminum alloy in which aluminum is present in a proportion of at least 40 at %.

According to the present invention, open-pored bodies composed of a metallic material are used as semifinished part for the production process. These can be foams, meshes, gauzes, woven materials, fiber tangles, felts or lay-ups which can represent a fiber structure composed of metal or metal alloys. It is advantageous to use open-pored foams composed of metal or metal alloys having weights per unit area in the range from 100 g/m²-10 000 g/m², more advantageously in the range of 300 g/m²-3000 g/m². Suitable metals and alloys for the porous starting materials comprise at least one element of the group Ni, Cu, Co, Fe, Ag. Such an open-pored semifinished part can, for example, be obtained by electrochemical coating of an open-pored polymer material with one of these metals. The organic constituents of the polymer can be removed by pyrolysis in a heat treatment. To produce expanded metal grids as semifinished part, metal sheets can be provided with linear stamping cuts offset relative to one another and be stretched. Metal felts are produced from wires which are cut into fibers of different thicknesses by means of serrated knives. Woven metal structure and gauzes can be obtained by ordered intermeshing of metal wires of different thicknesses. Furthermore, suitable open-pored metal structures as semifinished part can be obtained by additive manufacturing technologies such as 3D printing, selective laser melting, binder jetting or electron beam melting.

The open-pored, metallic semifinished part is coated with metallic particles which can be present in the form of a powder, a powder mixture, a suspension or a dispersion. The metallic powder should be pure aluminum powder or a powder of an aluminum alloy in which aluminum is present in a proportion of at least 40 at %. Coating of the semifinished part can be carried out by dipping, spraying, pressure-assisted, electrostatically and/or magnetically, with the open-pored structure of the semifinished part being retained. Particles having a size in the range of 0.5 μm-150 μm, more advantageously in the range of 5 μm-100 μm, are used for coating. The metal particles or alloy particles contain aluminum or aluminum together with other metals which as a result of a heat treatment can form a single-phase and/or multiphase alloy with aluminum. The particles used for coating contain aluminum in a proportion of 40 at % 100 at % and can additionally comprise at least one other element which forms a single-phase and/or multiphase alloy with aluminum in a proportion of 0 at %-60 at %. Such an element can advantageously be at least one of the elements Ni, Cu, Co, Mo, Fe, Ag, Mg, Si, Ti, W.

In an advantageous embodiment of the invention, a binder can be applied to the surface of the semifinished part in the process of coating the open-pored semifinished part with particles in order to improve the adhesion of the particles to the surface. The binder can be applied as a solution, dispersion or suspension in a liquid phase or as powder before or during coating of the semifinished part. The distribution of particles within a liquid phase containing the binder and also the adhesion thereof to surfaces of the semifinished part can be improved by action of mechanical energy, in particular vibration.

The application of particles as powder, powder mixture and/or suspension/dispersion can be repeated a number of times in order to obtain a greater, desired thickness of the coating. This also applies to the vibration to be carried out in each case and optionally application of a binder. However, it should be ensured during application that the open-pored structure is retained, but at least that the metal body is open-pored after a heat treatment by means of which the oxide layer C is formed.

In the course of a thermal treatment, organic constituents of the coated semifinished part can be removed by pyrolysis, vaporization and/or desorption. The organic constituents can be an organic binder, an organic solvent, organic constituents of a polymer or organic compounds adsorbed from the surroundings. The thermal treatment can be carried out in the temperature range of 400° C.-600° C. under an inert atmosphere and/or reduced pressure.

In the subsequent first thermal treatment, the coated semifinished part can preferably be heated at a heating rate of 1 K/min-20 K/min to a temperature in the range of 400° C.-1000° C., advantageously from 450° C. to 700° C., under an inert atmosphere and/or reduced pressure with a hold time of 0.1 s-30 min, advantageously 1 s-10 min. Here, the applied aluminum or aluminum-containing particles of the metal powder and the surface of the structure of the open-pored semifinished part are joined to one another by substance-to-substance bonding via sintering necks and bridges and aluminum-rich, intermetallic phases or mixed crystals are formed from the elements present in the particles on or with the surface of the open-pored metallic semifinished part. When using pure aluminum powder, a brief heating with formation of a liquid phase is carried out, so that aluminum in the liquid phase reacts exclusively at the surface of the open-pored semifinished part and the internal surface of the hollow spaces between the struts (when using a metal foam) with the metal or the alloy of which the open-pored semifinished part is made to form aluminum-rich intermetallic phases and mixed crystals. Both in the case of sintering using sinter-active particles and also in the case of melting, a gradated alloy is formed exclusively on the surface of the coated open-pored metal material with retention of the underlying ductile, metallic core layer. The gradation comprises various phases which are formed as a function of the phase state diagram of the elements used and the diffusion time available. The layer thickness of the resulting gradated layer having an alloy phase gradient can be 0.5 μm-100 μm, particularly advantageously 5 μm-50 μm. The thickness of the underlying core layer, which has exclusively the composition of the parent semifinished part or a single-phase mixed crystal alloy, can be in the range from 1 μm to 1000 μm. The layer thicknesses of the outer alloy phases and the internal core layer and also the ratio to one another can be influenced by the selection of appropriately thick struts of the open-pored starting material, the loading with aluminum or aluminum-containing particles and the temperature conditions during a sintering process.

In a concluding oxidation step during a second heat treatment, aluminum or single-phase and/or multiphase alloys of aluminum and at least one further metal M on the surface of the sintered, coated open-pored semifinished part, or such a part which has been heated to above the melting point of aluminum, form chemically defined, structured oxides which consist of pure aluminum oxide or at least have a high proportion of >50% of aluminum oxide and contain various polymorphs of aluminum oxide as a function of the duration and temperature of the treatment. Here, the oxide forms a closed or virtually closed surface layer. A virtually closed oxide layer C should cover at least 90% of the surface. The oxidative second heat treatment should be carried out at temperatures in the range of 450° C.-1250° C., advantageously 650° C.-1250° C., under an oxidizing atmosphere which can be formed by air, oxygen and/or mixtures with inert gases and under atmospheric pressure or reduced pressure. If the oxidative heat treatment is carried out at low temperatures in the range from 450° C. to 500° C., an increase in the thickness of the amorphous aluminum oxide layer occurs. In the temperature range of 630° C.-870° C., a virtually closed or closed crystalline γ-$Al_2O_3$ layer is formed on the surface of the semifinished part. Above an oxidation temperature of ≥920° C., a mixed oxide layer C consisting of the polymorphs γ-$Al_2O_3$, θ-$Al_2O_3$ and α-$Al_2O_3$ is formed. The proportion of the γ-$Al_2O_3$ phase can be reduced in favor of the θ-$Al_2O_3$ and α-$Al_2O_3$ phases by increasing duration and temperature of the treatment. Above an oxidation temperature of 1020° C., exclusively θ-$Al_2O_3$ and α-$Al_2O_3$ phases are detectable in the oxide layer (XRD). A powder-diffractometrically pure α-$Al_2O_3$ oxide layer, which has the highest density of all polymorphs of aluminum oxide ($\rho_\alpha$=3990 kg/$m^3$), is obtained according to the invention by oxidation at ≥1200° C.

The open-pored body produced by this process can be used as structured support material for a functional coating. Coating can be carried out by dipping, spraying, wet impregnation, dry impregnation or capillary impregnation, precipitation, coprecipitation, electrochemical deposition, vapor deposition and/or immobilization of metal organic complexes, with coating of the structured support material with a functional coating also being able to comprise a dry step, a reduction step and/or concluding calcination of the material. Calcination at temperatures below the chosen oxidation temperature is particularly advantageous in order to avoid undesirable progress of the oxidation. As active components of the functional coating, it is possible to use, for example, noble metals such as Pt, Pd, Rh, Ru, Au, Os, Ir, Ag and further transition metals such as Cr, Mn, Fe, Co, Ni, Mo, Re, V, Cu, W and also oxides or metal-organic complexes thereof.

Furthermore, single-phase and/or multiphase alloys of aluminum and at least one of the metals M=Ni, Co, Fe, Cu and/or Ag and also pure aluminum layers form chemically defined, structured oxide layers of various aluminum oxide polymorphs under selected conditions in an oxidative heat treatment. Oxygen partial pressure, duration and temperature of the oxidative treatment determine the composition and properties of the final oxide layer. In the temperature range of 300° C.-500° C. using air as oxidant, growth of the layer thickness of the natural, amorphous aluminum oxide layer can be observed, and this layer can attain a thickness of 9 nm and have a density of $\rho_{am}$=3050 kg/m$^3$. If the oxidative treatment is carried out at at least 630° C.-870° C. an at least virtually closed, crystalline γ-Al$_2$O$_3$ surface layer having a density of $\rho_\gamma$=3660 kg/m$^3$ is formed. At an oxidation temperature of 920° C., a mixed oxide layer C consisting of the polymorphs γ-Al$_2$O$_3$, θ-Al$_2$O$_3$ and α-Al$_2$O$_3$ is formed. With increasing duration and temperature of the oxidation, the proportion of the γ-Al$_2$O$_3$ phase decreases in favor of the θ-Al$_2$O$_3$ and α-Al$_2$O$_3$ phases. At an oxidation temperature of 1020° C., exclusively θ-Al$_2$O$_3$ and α-Al$_2$O$_3$ phases are detectable in the oxide layer C (XRD). A powder-diffractometrically pure α-Al$_2$O$_3$ oxide layer having a thickness of ≥500 nm and a density of $\rho_\alpha$=3990 kg/m$^3$ can be obtained by oxidation at ≥1200° C. As a coating, aluminum oxide increases the heat resistance, oxidation and corrosion resistance and life of catalytically active materials and catalytic supports by acting as diffusion barrier for oxygen and reactive substances. Furthermore, the formation of a closed aluminum oxide layer as diffusion barrier on an open-pored nickel support can hinder or even completely prevent poisoning of functional coatings used for the catalysis by diffusion of nickel cations into the catalytically active layer. In this context, the formation of aluminum oxide phases having high densities is advantageous; the formation of α-Al$_2$O$_3$, which has the highest density of all the polymorphs, is particularly advantageous. The formation of aluminum-rich surface oxides also makes an increase in the mechanical stability and compressive strength of open-pored support materials which consist of ductile metals or alloys and can be plastically deformed under the pressure of the weight of shaped bodies arranged above them in a reactor possible. For example, the compressive strength in accordance with DIN 50134/ISO 13314 of an open-pored cobalt foam can be more than tripled to 5 MPa by coating with aluminum and formation of cobalt and aluminum mixed oxides on the surface of the material. The use of open-pored starting substrates offers the opportunity of providing structured support materials having advantageous flow properties, high specific surface areas and consequently high catalytic activities.

A great challenge in coating open-pored materials with pure or aluminum-rich oxide layers lies in the selection of suitable substrates having a sufficient weight per unit area, powders having an optimal particle size distribution and also a suitable heat treatment in the production of an open-pored metal foam. Here, the temperature conditions should be selected so that a reaction occurs only at the surface since a complete reaction through to the base material of a core layer would cause embrittlement due to formation of intermetallic phases. In addition, the formation of intermetallic phases, in particular in the case of NiAl, is strongly exothermic so that the hold time at maximum temperature should be kept short in order for the porous structure not to be destroyed by formation of an excessive amount of liquid phase. It is therefore useful to control the reaction by means of the temperature conditions in such a way that a gradient with aluminum-rich phases at the surfaces and a decreasing aluminum content to the core layer, i.e. the base material of a semifinished part, is formed and the core layer thus remains ductile. This is ensured particularly when using sinter-active aluminum alloys containing, for example, Mg and/or Si, in which case the heat treatment temperature should be kept below the melting point of aluminum of 660° C. An illustrative alloy for this purpose is EA 321 from Ecka Granules. An advantage here is that the high aluminum content at the surface promotes the formation of a closed α-aluminum oxide layer and the formation of oxides of the base material can be suppressed as a result of the different diffusion distances to the surface.

The invention will be illustrated by way of example below.

DESCRIPTION OF THE DRAWING

The drawing shows:
FIG. 1 a sectional view through an example of an open-pored metal body according to the invention.

DETAILED DESCRIPTION OF THE INVENTION

Here, a core layer A, which can either be made of solid material or of struts which are hollow inside and comprises one of the metals Ni, Co, Fe, Cu, Ag or an alloy thereof, is provided with a gradated layer B. The oxide layer C is formed on the gradated layer B. This structure can form a support material A-C, with a functional coating D being able to be formed on the oxide layer C.

It is possible to form an at least virtually closed oxide layer C which can function as controllable diffusion barrier and/or as thermal and electrical insulator between an active, functional coating D, applied on top and an underlying gradated layer B and also a metal core layer A of the semifinished part which ensure the oxidation and corrosion resistance of the structured support material under chemical and thermal stress, increase the mechanical stability of the open-pored, structured support material and make permanent, strong adhesion of an active, functional coating possible.

Some metals, including Ni, Co, Fe, Cu and Ag, together with aluminum form intermetallic phases which can be converted by an oxidative treatment into pure aluminum oxide or mixed metallic oxides having a high proportion of aluminum oxide, which as coating on ductile metals reduce their elastic deformability, increase the mechanical stability, improve the adhesion of a functional coating D and as diffusion barrier controllable hinder or prevent the undesirable migration of elements from the metallic core layer and also the gradated layer into a functional coating formed thereon and can drastically improve the life of a metallic core layer A, a structured support material and a functional coating D. Especially in the field of electrochemical applications, for example the production of batteries and electrodes, the permanence of a high electrical conductivity and also thermal conductivity of the metallic core layer A and of the gradated layer B is advantageous. The oxide layer C can in this case function as insulator between the surface of the metallic core layer A, gradated layer B and a functional coating D. Furthermore, the oxide layer C passivates the metallic core layer A and the gradated layer B against corrosive media and thus prevents a decrease in the electrical and thermal conductivities as a result of corrosion and undesirable diffusion of elements from the metallic core layer A and the gradated layer B into a functional coating D formed thereon and also release of such elements into a surrounding medium.

Some of the catalysts used in the chemical industry lose activity with an increasing period of operation as a result of various effects such as physical and chemical wear, dusting and leaching, i.e. the washing out of active metals in the reaction medium, so that they are consequently removed with the products and are no longer available for the catalysis. Apart from complete prevention of the undesirable migration of elements from the metallic core layer A and the gradated layer B by means of an oxide layer C functioning as diffusion barrier, their diffusivity for metal atoms and ions can be influenced by thickness, composition, crystal structure and density of the oxide layer C. This can be achieved by control of the chemical composition of the oxide layer C via the composition of the gradated phase in the gradated layer B, the thickness of the oxide layer C via duration, temperature and oxygen partial pressure in the oxidation process and also the phase composition via the temperature of the oxidation process. The metallic core layer A can comprise metals which represent the active component of a functional coating D. In this case, a desired, controlled migration of elements from the core layer A and the gradated layer B through the oxide layer C into the functional coating D allows compensation for the active component lost as a result of physical and chemical wear effects and makes a high catalytic activity combined with relatively long catalyst operating lives possible.

WORKING EXAMPLES

Working Example 1—Not According to the Invention

An open-pored nickel foam having a cell size of the pores of 580 μm, a weight per unit area of 1000 g/m² and a porosity of about 94%, a wall thickness of the struts between pores of 20 μm and a specimen size of 80 mm×80 mm, thickness 1.9 mm; produced by electrolytic deposition of Ni on PU foam and burning-out of the organic constituents, is used as semifinished part.

Pure Al metal powder having an average particle size of <63 μm and a mass of 20 g is used for coating the semifinished part surface.

As binder for the Al metal powder, a 1% strength aqueous solution of polyvinylpyrrolidone having a volume of 15 ml is produced.

The nickel foam forming the semifinished part is sprayed on both sides with this binder solution. The foam is subsequently fixed in a vibration device and sprinkled on both sides with the Al metal powder. As a result of the vibration, this powder is uniformly distributed in the porous network of the foam. The procedure is repeated four times.

Binder removal and sintering of the Al metal powder are carried out in a first heat treatment in a nitrogen atmosphere. For this purpose, a tube furnace is heated to 660° C. The coated semifinished part is brought from a zone having a temperature of 200° C. into a zone having a temperature of 660° C. for 2 s and then back into the cooler zone having a temperature of 200° C.

During the heat treatment, most of the aluminum powder melts and reacts with the near-surface zones of the nickel foam struts. This forms a gradient of aluminum-rich and low-aluminum mixed crystals, phases with eutectic composition and also intermetallic phases of the material system Ni—Al with a concentration gradient between the aluminum-rich surface and the core surface region which is formed by pure nickel of the semifinished part material. The aluminum-rich phase $NiAl_3$ with some additional either pure (100% by mass of Al) or eutectic (~94% by mass of Al) aluminum regions remains on the surface. The proportion of aluminum decreases from the surface in the direction of the interior of the core layer A, in particular the struts of a metal foam. The layer thickness of the gradated layer B with the resulting alloy phase gradient is 15 μm. A pure Ni layer, which forms the core layer A and has a layer thickness of 10 μm, remains in the interior of the struts.

In the next step, the aluminum-rich surface is utilized to produce a pure aluminum oxide covering layer C on the strut surface by oxidation, which covering layer C increases the thermal and chemical stability as a result of its passivating properties, decreases the diffusion of nickel ions on the surface and also improves the mechanical strength of the metallic semifinished part material which forms the core layer A. Oxygen partial pressure, duration and temperature of the oxidation are selected so that migration of aluminum atoms in the direction of the core layer A and the unwanted, complete oxidation down to the surface of the core layer A, in particular the struts of a metal foam, is prevented so as to rule out embrittlement of the material. The oxidation is carried out at a temperature of 635° C. in a preheated furnace over a time of 65 minutes using air as oxidant. During the oxidation, the thickness of the amorphous aluminum oxide layer C firstly increases to a critical thickness of 5 nm. After attainment of the critical thickness of the aluminum oxide layer C, cubic $\gamma$-$Al_2O_3$ crystals, which have a higher density and initially cover only part of the surface, are formed from the amorphous aluminum oxide phase. After an oxidative treatment for 65 minutes, a closed $\gamma$-$Al_2O_3$ layer C is formed on the surface of the struts which form the core layer A. The structured support material A-C is subsequently taken from the furnace and cooled at room temperature. This finally gives a 0.5 μm thick aluminum oxide layer C which contains predominantly $\gamma$-$Al_2O_3$ and has a density of 3660 kg/m³.

Working Example 2

An open-pored cobalt foam having a cell size of the pores of 800 μm, having a weight per unit area of 1500 g/m² and a porosity of about 89%, a wall thickness of the struts arranged between pores of 30 μm and a specimen size of 80 mm×80 mm, thickness 2.5 mm, is used as semifinished part. The semifinished part is produced by electrolytic deposition of Co on PU foam and subsequently burning-out of the organic constituents. Here, the struts form the core layer A.

Al metal powder having an average particle size of <63 μm and a mass of 30 g was used for the coating.

To form the surface coating of the semifinished part, a 1% strength aqueous solution of polyvinylpyrrolidone having a volume of 20 ml is prepared as binder.

The cobalt foam of the semifinished part is sprayed on both sides with the binder solution. The semifinished part coated with the binder solution on the surfaces is subsequently fixed in a vibration device and sprinkled on both sides with the Al metal powder. As a result of the vibration, the Al metal powder is homogeneously distributed in the porous network of the semifinished part material. The procedure is repeated five times.

Binder removal and sintering of the semifinished part coated with binder solution and Al metal powder is carried out in a nitrogen atmosphere. For this purpose, a tube furnace was heated to 665° C. The coated semifinished part is brought from a zone having a temperature of 200° C. into a zone having a temperature of 665° C. for 5 s and then back into the cooler zone having a temperature of 200° C.

During the first heat treatment, most of the Al metal powder melts and reacts with the near-surface zones of the cobalt foam struts of the semifinished part forming the core layer A. Here, a gradated layer B, which consists of aluminum-rich and low-aluminum mixed crystals, phases having a eutectic composition and also intermetallic phases of the material system Co—Al corresponding to the concentration gradient, are formed at the surface starting out from the aluminum-rich surface to the pure cobalt core layer A of the semifinished part material. The aluminum-rich phase $Co_2Al_9$ with some additional either pure (100% by mass of Al) or eutectic (~99% by mass of Al) aluminum regions remains at the surface. The proportion of aluminum decreases from the surface in the direction of the interior of the struts. The layer thickness of the surface region with the gradated layer B with resulting alloy phase gradients is 20 μm. A pure cobalt core layer A having an average layer thickness of the struts between pores of 20 μm remains in the interior of the struts.

In the subsequent oxidation step, the aluminum-rich surface is utilized in a second heat treatment to form a pure aluminum oxide layer C on the strut surface by oxidation, which layer C increases the thermal and chemical stability due to its passivating properties, reduces the diffusion of cobalt ions at the surface and increases the mechanical strength of the metallic base material. Oxygen partial pressure, duration and temperature of the oxidation are selected so that migration of aluminum atoms in the direction of the cobalt core layer A and also the unwanted, complete oxidation through to the surface of the core layer A is prevented in order to rule out embrittlement of the material. The oxidation is carried out at 1050° C. in the preheated furnace over a time of 15 minutes using air as oxidant. During the oxidation, the thickness of the amorphous aluminum oxide layer C grows to a critical thickness of 5 nm. After attainment of the critical thickness, cubic $\gamma$-$Al_2O_3$ crystallites, which have a higher density and cover part of the strut surfaces, are formed from the amorphous aluminum oxide phase. With increasing duration of the oxidative treatment, a closed $\gamma$-$Al_2O_3$ layer is formed on the surface of the struts. After 15 minutes, a closed covering layer containing $\theta$-$Al_2O_3$ as secondary phase and $\alpha$-$Al_2O_3$ as main phase has been formed from the closed $\gamma$-$Al_2O_3$ layer as a result of the transitions of $\gamma$- to $\delta$- to $\theta$- and finally to $\alpha$-$Al_2O_3$. The foam is subsequently taken from the furnace and cooled at room temperature. An aluminum oxide layer C which has a thickness of 0.5 μm-1 μm and contains, apart from a small proportion of $\theta$-$Al_2O_3$, predominantly $\alpha$-$Al_2O_3$, has a high density of up to 3990 kg/m$^3$ and has, at 5 MPa, more than three times the compressive strength of a pure cobalt foam (1.5 MPa) is finally obtained.

Working Example 3

An open-pored silver foam having a cell size of the pores of 450 μm, a weight per unit area of 2000 g/m$^2$ and a porosity of about 88%, a wall thickness of the struts of which the core layer A is formed and which are arranged between pores of 50 μm and a specimen size of 75 mm×65 mm, thickness 1.7 mm, is used as semifinished part. The semifinished part is produced by electrolytic deposition of Ag on PU foam and subsequent burning-out of the organic constituents.

A prealloyed AgAl metal powder consisting of 27% by weight of Al and 73% by weight of Ag and having an average particle size of <75 μm and a mass of 60 g was used for coating.

To form the surface coating of the semifinished part, a 1% strength aqueous solution of polyvinylpyrrolidone having a volume of 30 ml is prepared as binder.

The silver foam of the semifinished part is sprayed on both sides with the binder solution. The semifinished part which has been coated on the surfaces with the binder solution is subsequently fixed in a vibration device and sprinkled on both side with the prealloyed AgAl metal powder. As a result of the vibration, the prealloyed AgAl metal powder is homogeneously distributed in the porous network of the semifinished part material. The procedure is repeated eight times.

Binder removal and sintering of the semifinished part coated with binder solution and prealloyed AgAl metal powder is carried out in a nitrogen atmosphere. For this purpose, a tube furnace is heated to 590° C. The coated semifinished part is brought from a zone having a temperature of 200° C. into a zone having a temperature of 590° C. for 10 s and then back into the cooler zone having a temperature of 200° C.

During the first heat treatment, most of the prealloyed AgAl metal powder melts and reacts with the near-surface zones of the silver foam struts of the semifinished part forming the core layer A. Here, a gradated layer B, which consists of aluminum-rich and low-aluminum mixed crystals and also intermetallic phases of the material system Ag—Al according to the concentration gradient, is formed on the surface starting from the aluminum-rich surface through to the pure silver core layer A of the semifinished part material. The aluminum-rich phase $Ag_2Al$ remains at the surface. Virtually no pure (100% by mass of Al) aluminum regions were able to be observed because of the prealloying. The proportion of aluminum decreases from the surface in the direction of the interior of the struts. The layer thickness of the surface region with the gradated layer B with resulting alloy phase gradient is 25 μm. A pure silver core layer A having an average layer thickness of the struts between pores of 25 μm remains in the interior of the struts.

In the subsequent oxidation step, the aluminum-rich surface is utilized in a second heat treatment to form a pure aluminum oxide covering layer on the strut surface by oxidation, which covering layer increases the thermal and chemical stability due to its passivating properties, reduces the diffusion of silver ions at the surface and increases the mechanical strength of the metallic base material. Oxygen partial pressure, duration and temperature of the oxidation are selected so that migration of aluminum atoms in the direction of the silver core layer A and also the unwanted, complete oxidation through to the surface of the core layer A, i.e. to the surface of the struts, is prevented so as to rule out embrittlement of the material. The oxidation is carried out at 900° C. in the preheated furnace over a period of 10 minutes using air as oxidant. During the oxidation, the thickness of the amorphous aluminum oxide layer grows to a critical thickness of 5 nm. After attainment of the critical thickness, cubic $\gamma$-$Al_2O_3$ crystallites, which have a higher density and cover part of the strut surfaces, are formed from the amorphous aluminum oxide phase. With increasing duration of the oxidative treatment, a closed $\gamma$-$Al_2O_3$ layer is formed on the surface of the struts. After 10 minutes, a closed covering layer containing both $\theta$-$Al_2O_3$ and $\alpha$-$Al_2O_3$ has been formed from the closed $\gamma$-$Al_2O_3$ layer as a result of the transitions from $\gamma$- to $\delta$- to $\theta$- and finally to $\alpha$-$Al_2O_3$. The foam is subsequently taken from the furnace and cooled at room temperature. An aluminum oxide layer C which has a thickness of 0.5 μm-2 μm and contains $\theta$-$Al_2O_3$ and $\alpha$-$Al_2O_3$, has a high density of up to 3990 kg/m$^3$ and, at 4 MPa, has more than four times the compressive strength of a pure silver foam (1 MPa) is finally obtained.

The invention claimed is:
1. A process for producing an open-pored metal body, coating the surface of an open-pored semifinished part forming the core layer and consisting of Ni, Co, Fe, Cu, Ag or an alloy comprising one of these chemical elements, where one of these chemical elements is present in a proportion of more than 40 at % in the alloy, with pure aluminum powder or a powder of an aluminum alloy in which aluminum is present in a proportion of at least 40 at %; forming a gradated layer which comprises intermetallic phase or mixed crystals of Al on the surface of the open-pored semifinished part in a first heat treatment; and forming an aluminum oxide layer composed of pure $\alpha$-$Al_2O_3$ phase under oxidizing conditions from Al on the gradated layer in a subsequent second heat treatment of a temperature of at least 1200° C.

2. The process as claimed in claim 1, wherein the powder of an aluminum alloy in which aluminum and at least one of the metals selected from among Ni, Cu, Co, Mo, Fe, Ag, Mg, Si, Ti and W are present is used.

3. The process as claimed in claim 1, wherein the coating of the open-pored semifinished part surface, pure aluminum powder or a powder of an aluminum alloy is sprinkled on the surface of the open-pored semifinished part which has been coated with a binder in the form of a suspension or dispersion, with powder which has been sprinkled on and fixed to the surface by means of the binder, electrostatically or by means of action of magnetic force.

4. An open-pored metal body produced by a process as claimed in claim 1, wherein it comprises the core layer consisting of Ni, Co, Fe, Cu, Ag or an alloy comprising one of these chemical elements, where one of these chemical elements is present in a proportion of more than 25 at % in the alloy, and the gradated layer comprising of the intermetallic phase or mixed crystals of Al is formed on surfaces of the core layer and the layer of aluminum oxide composed of pure $\alpha$-$Al_2O_3$ is formed on the gradated layer.

5. The open-pored metal body as claimed in claim 1, wherein the core layer comprises a metal foam, a mesh, a gauze, woven material, felt, lay-up or an open-pore body produced by an additive manufacturing process.

6. The open-pored metal body as claimed in claim 1, wherein the gradated layer or the aluminum oxide layer cover the surface of the core layer to an extent of at least 90%.

7. The open-pored metal body as claimed in claim 4, wherein the gradated layer has a thickness in the range from 1 μm to 50 μm or the aluminum oxide layer has a layer thickness in the range from 0.05 μm to 1 μm.

8. The open-pored metal body as claimed in claim 1, wherein a functional coating has been formed on the aluminum oxide layer.

\* \* \* \* \*